United States Patent
Yang et al.

(10) Patent No.: US 10,681,272 B2
(45) Date of Patent: Jun. 9, 2020

(54) DEVICE FOR PROVIDING REALISTIC MEDIA IMAGE

(71) Applicant: FOUNDATION FOR RESEARCH AND BUSINESS, SEOUL NATIONAL UNIVERSITY OF SCIENCE AND TECHNOLOGY, Nowon-gu, Seoul (KR)

(72) Inventors: Ji Hee Yang, Seoul (KR); So Yeon Jeon, Seoul (KR); Young Ae Kim, Seoul (KR); Ji Hye Jeon, Seoul (KR); Goo Man Park, Seoul (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/429,703

(22) Filed: Jun. 3, 2019

(65) Prior Publication Data
US 2019/0364207 A1 Nov. 28, 2019

Related U.S. Application Data

(63) Continuation of application No. PCT/KR2017/012994, filed on Nov. 16, 2017.

(30) Foreign Application Priority Data

Dec. 2, 2016 (KR) .......................... 10-2016-0163541

(51) Int. Cl.
*H04N 5/232* (2006.01)
*G06T 3/40* (2006.01)
(Continued)

(52) U.S. Cl.
CPC ....... *H04N 5/23238* (2013.01); *G06T 3/4038* (2013.01); *G06T 5/50* (2013.01); *H04N 5/247* (2013.01)

(58) Field of Classification Search
CPC ......... G06T 19/00; G06T 3/4038; G06T 5/50; H04N 5/23238; H04N 5/247
See application file for complete search history.

(56) References Cited

U.S. PATENT DOCUMENTS 9,451,162 B2 * 9/2016 Van Hoff ............. H04N 13/189
9,992,412 B1 * 6/2018 Tyagi ................. H04N 5/23238
(Continued)

FOREIGN PATENT DOCUMENTS

KR  10-2013-0068193 A  6/2013
KR  10-1413393 B1  6/2014
(Continued)

OTHER PUBLICATIONS

Aljoscha Smolic, 3D video and free viewpoint video—From capture to display, available online Sep. 15, 2010, Elsevier, Pattern Recognition 44 (2011) pp. 1958-1968. (Year: 2011).*
(Continued)

*Primary Examiner* — Amy R Hsu
(74) *Attorney, Agent, or Firm* — Hamre, Schumann, Mueller & Larson, P.C.

(57) ABSTRACT

A device for providing a realistic media content, includes: inward facing image acquisition unit configured to acquire multiple inward facing images that are taken by an inward method using multiple cameras arranged around an object; an outward facing image acquisition unit configured to acquire multiple outward facing images that are taken by an outward method using the multiple cameras arranged around a point; a background image generation unit configured to generate a 360° cylindrical image by stitching the multiple
(Continued)

outward facing images and then convert the 360° cylindrical image into a 360° spherical image to generate a background image; a 3D object reconstruction unit configured to extract a region of the object from the multiple inward facing images to generate a 3D object; and a combined image transmission unit configured to combine the background image with the 3D object and transmit the combined image to a display device.

5 Claims, 6 Drawing Sheets

(51) Int. Cl.
  G06T 5/50 (2006.01)
  H04N 5/247 (2006.01)

(56) References Cited

U.S. PATENT DOCUMENTS

| | | | | |
|---|---|---|---|---|
| 10,114,221 B1 * | 10/2018 | Evans, V | ................ | G03B 29/00 |
| 10,217,185 B1 * | 2/2019 | Cabanero | .............. | G06F 1/1626 |
| 10,257,494 B2 * | 4/2019 | Sadi | ....................... | H04N 19/61 |
| 2001/0043737 A1 | 11/2001 | Rogina et al. | | |
| 2014/0104378 A1 * | 4/2014 | Kauff | ..................... | H04N 5/247 |
| | | | | 348/38 |
| 2018/0192033 A1 * | 7/2018 | Gallup | ................... | H04N 5/247 |

FOREIGN PATENT DOCUMENTS

| KR | 1020150010752 A | 1/2015 |
|---|---|---|
| KR | 10-1538947 B1 | 7/2015 |

OTHER PUBLICATIONS

International Search Report (English) of PCT/KR2017/012994 dated Feb. 20, 2018.

Yang, Ji Hee, "A Study on Panoramic Image Generation using Color Histogram in Free Viewpoint Image", A Master's Thesis in Engineering, Seoul National University of Science and Technology, Feb. 2015; with English translation.

* cited by examiner

DEVICE FOR PROVIDING REALISTIC MEDIA IMAGE

TECHNICAL FIELD

The present disclosure relates to a device for providing realistic media image.

BACKGROUND

As the media use environment has recently changed from watching TV in real time to using online video services, the percentage of personal media and individual broadcasting services such as a multi-channel network (MCN) has increased. The creation of contents for personal media and personal broadcasting systems are being considered as an important research field. Particularly, MCNs and content quality are improving rapidly. However, realistic viewing technology has not yet been commercialized and is still in a research stage.

Further, regarding a method for displaying realistic media, a virtual reality (VR) imaging technology has been suggested to provide a three-dimensional scene from a certain location in a certain direction as desired by a user, but has focused mostly on the creation of contents. Imaging technology and system still need to be researched. Particularly, in realistic media broadcasting, a method for efficient information exchange between a content provider and viewers needs to be researched, and there has been a demand for research to obtain realistic media and efficiently transfer information.

Regarding methods for managing such large scale images, Korean Patent Publication No. 10-2015-0010752, which is a prior art, relates to 3D video coding method based on panorama, and discloses the formation of a panoramic video from multi-view taken by multiple cameras, through a stitching algorithm.

DISCLOSURE OF THE INVENTION

Problems to be Solved by the Invention

The present disclosure provides a device for providing a realistic media content that can combine images taken by an inward method with images taken by an outward method and display a single 360° image. The present disclosure provides a device for providing a realistic media content that provides a user with a sense of immersion, a stereoscopic effect, and a sense of reality and helps the user feel like being in the scene. The present disclosure provides a device for providing a realistic media content that enables a user to observe up, down, left, right, and zoom controls of a 360° image from free viewpoints. The present disclosure provides a device for providing a realistic media content that can select and control a moving object in the content through 3D object modeling.

Means for Solving the Problems

As technical means for solving above problems, in one embodiment of the present disclosure may provide, a device for providing a realistic media content, including: an inward facing image acquisition unit configured to acquire multiple inward facing images that are taken by an inward method using multiple cameras arranged around an object; an outward facing image acquisition unit configured to acquire multiple outward facing images that are taken by an outward method using the multiple cameras arranged around a point; a background image generation unit configured to generate a 360° cylindrical image by stitching the multiple outward facing images and then convert the 360° cylindrical image into a 360° spherical image to generate a background image; a 3D object reconstruction unit configured to extract a region of the object from the multiple inward facing images to generate a 3D object; a user interface unit configured to receive a view change signal and an instruction signal about the object from an input device; an input signal control unit configured to control the background image and the 3D object based on the received view change signal and instruction signal; and a combined image transmission unit configured to combine the background image with the 3D object and transmit the combined image to a display device.

The distortion correction unit may include: a corrected pattern image acquisition unit configured to acquire corrected pattern images from the multiple cameras arranged at a predetermined distance from the object; a parameter calculation unit configured to calculate internal parameters based on focal lengths of the lenses of the multiple cameras and a location of the object and calculate external parameters based on location information of the multiple cameras; and a distortion model estimation unit configured to estimate a distortion model of the multiple cameras based on the internal parameters and the external parameters.

The 3D object reconstruction unit may include: an object extraction unit configured to separate the region of the object and the background image from the multiple distortion-corrected inward facing images and extract only the region of the object; a 3D information extraction unit configured to extract 3D information of the object using the internal parameters and the external parameters and generate a 3D mesh based on the 3D information; and a texture mapping unit configured to assign color values to the 3D mesh.

The background image generation unit may include: a cylindrical projection unit configured to project the multiple outward facing images onto a cylinder by using a cylindrical coordinate converter; a shift algorithm unit configured to extract at least one feature of size, location, and illumination of the multiple outward facing images; a homography estimation unit configured to estimate a homography with an error equal to or lower than a preset value based on the features and then stitch the multiple outward facing images; and a color correction unit configured to correct colors of the stitched image.

Above-described means for solving the problems are provided by way of illustration only and should not be construed as limiting in any manner. Besides the above-described exemplary embodiments, there may be additional exemplary embodiments that become apparent by reference to the drawings and the detailed description that follows.

Effects of the Invention

According to any one of the means for solving the problems of the present disclosure described above, it is possible to provide a device for providing a realistic media content that can combine images taken by an inward method with images taken by an outward method and display a single 360° image. Also, it is possible to provide a device for providing a realistic media content that provides a user with a sense of immersion, a stereoscopic effect, and a sense of reality and helps the user feel like being in the scene. Further, it is possible to provide a device for providing a realistic media content that enables a user to observe up, down, left, right, and zoom controls of a 360° image from free viewpoints. Furthermore, it is possible to provide a device for providing a realistic media content that can select and control a moving object in the content through 3D object modeling.

BEST MODE FOR CARRYING OUT THE INVENTION

Figure 1:
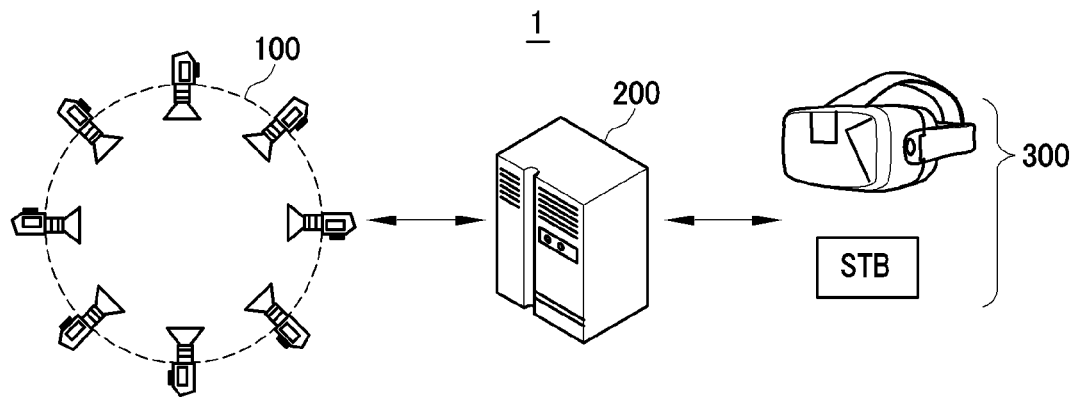
FIG. 1 is a diagram showing the configuration of a realistic media content providing system according to an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereinafter, embodiments of the present disclosure will be described in detail with reference to the drawings. FIG. 1 is a diagram showing the configuration of a realistic media content providing system according to an embodiment of the present disclosure.

Referring to FIG. 1, a realistic media content providing system 1 may include multiple cameras 100, a realistic media content providing device 200, and a display device 300. The multiple cameras 100, the realistic media content providing device 200 and the display device 300 illustrated in FIG. 1 are examples of components that can be controlled by the realistic media content providing system 1.

The components of the realistic media content providing system 1 illustrated in FIG. 1 can be typically connected to each other through a network. Herein, the network refers to a connection structure that enables the exchange of information between nodes such as devices and servers, and examples of the network may include Wi-Fi, Bluetooth, Internet, LAN (Local Area Network), Wireless LAN (Wireless Local Area Network), WAN (Wide Area Network), PAN (Personal Area Network), 3G, 4G, LTE, and the like, but are not limited thereto.

The multiple cameras 100 may take images of an object by an inward method and generate multiple inward facing images. The multiple inward facing images are multi-view images of the object, and may be a 360° view of the object.

When taking inward facing images, the multiple cameras 100 may be arranged on a circle around the object with a first radius. The arrangement of the multiple cameras 100 is not limited thereto. The multiple cameras 100 may be arranged on a layered hemisphere around the object.

The multiple cameras 100 may take images of the object in a chroma-key background.

The multiple cameras 100 may take images of the background by an outward method and generate multiple outward facing images.

When taking outward facing images, the multiple cameras 100 may be arranged on a circle around one point in a place with a second radius. For example, the first radius when taking inward facing images may be identical to the second radius when taking outward facing images. For example, the multiple cameras 100 may be installed in the same frames, and the multiple cameras 100 may rotate to change only the directions of lenses of the multiple cameras from inwards to outwards and take multiple inward facing images and multiple outward facing images. Otherwise, the first radius and the second radius may be different from each other.

The multiple cameras 100 may provide the multiple inward facing images and the multiple outward facing images to the realistic media content providing device 200.

The realistic media content providing device 200 may acquire the multiple inward facing images and the multiple outward facing images from the multiple cameras 100.

The realistic media content providing device 200 may generate a 3D object by correcting distortion of the multiple inward facing images and extracting a region of the object from the multiple inward facing images.

The realistic media content providing device 200 may generate a 360° background image by stitching the multiple outward facing images.

The realistic media content providing device 200 may receive a view change signal and an instruction signal about the object through an interface and control the 360° background image and the 3D object based on the received view change signal and instruction signal.

The realistic media content providing device 200 may combine the controlled background image and 3D object and transmit the combined image to the display device 300.

The display device 300 is a device configured to receive a realistic media content from the realistic media content providing device 200 and display the realistic media content, and may include a set-top box (STB), a smart phone, smart glasses, a smart pad, a tablet PC, 3G, 4G and 5G devices, CDMA (Code Division Multiple Access)-2000, W-CDMA (W-Code Division Multiple Access), Wibro (Wireless Broadband Internet), PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, and the like.

The display device 300 may be connected to an input device (not illustrated) such as a remote controller, a keyboard, a mouse, a touch pad, a motion sensor, a pupil sensor, or a microphone. The display device 300 may receive instruction signals to select, act, and move the object or view change signals to move up, down, left and right and zoom in and out through the input device and then transmit the received signals to the realistic media content providing device 200.

Hereafter, the realistic media content providing device 200 will be described in detail with reference to FIG. 2.

Figure 2:
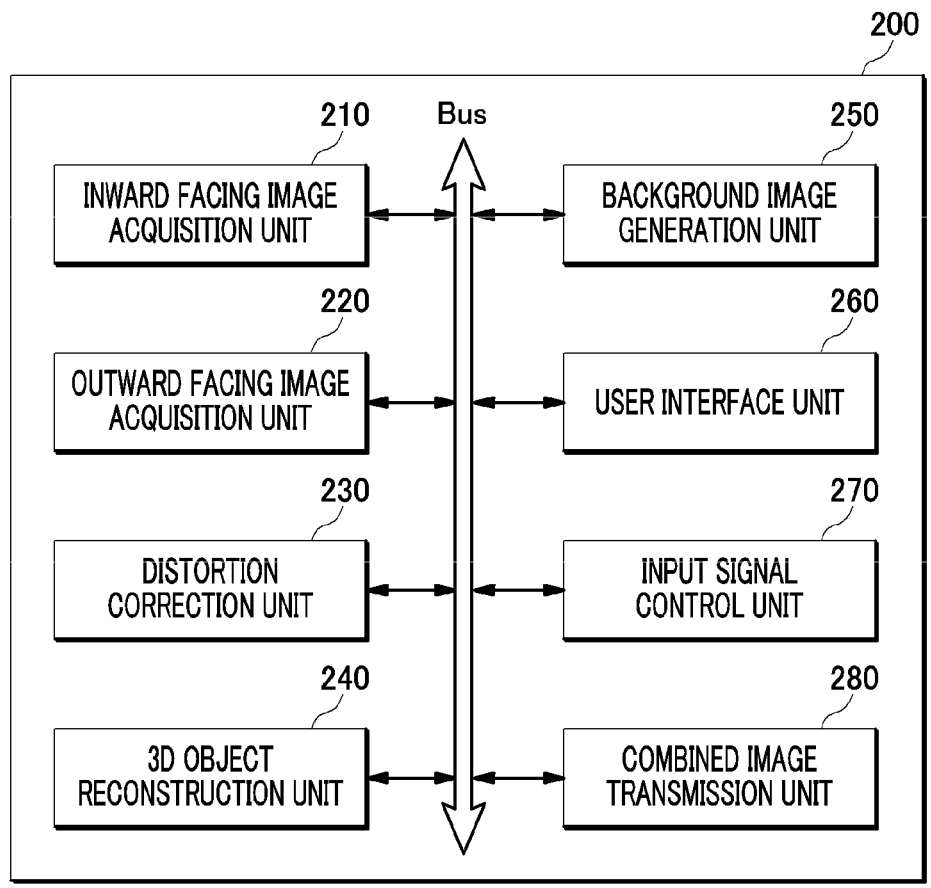
FIG. 2 is a diagram showing the configuration of a realistic media content providing device according to an embodiment of the present disclosure.

FIG. 2 is a diagram showing the configuration of a realistic media content providing device according to an embodiment of the present disclosure. Referring to FIG. 2, the realistic media content providing device 200 may include an inward facing image acquisition unit 210, an outward facing image acquisition unit 220, a distortion correction unit 230, a 3D object reconstruction unit 240, a background image generation unit 250, a user interface unit 260, an input signal control unit 270, and a combined image transmission unit 280.

The inward facing image acquisition unit 210 may acquire multiple inward facing images from the multiple cameras, a DB, or an external server. Hereafter, an inward facing image will be explained with reference to FIG. 3.

Figure 3:
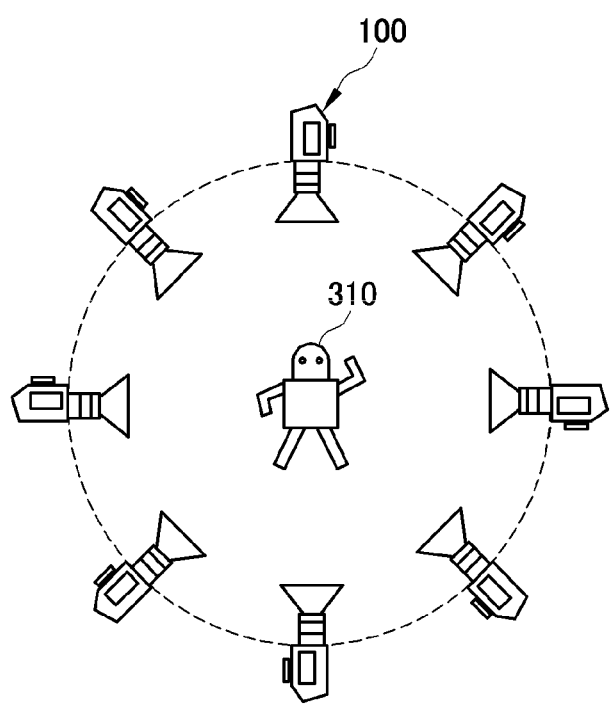
FIG. 3 is a diagram provided to explain an inward method according to an embodiment of the present disclosure.

FIG. 3 is a diagram provided to explain an inward method according to an embodiment of the present disclosure. Referring to FIG. 3, the multiple cameras 100 may be placed around an object 310 and may take images of the object 310 toward the inside. The multiple cameras 100 may be arranged on a circle at a predetermined distance from the object 310.

FIG. 3 illustrates eight cameras, but the number of cameras is not limited thereto and there may be fewer or more cameras. The multiple cameras 100 placed around the object may acquire multiple inward facing images of the object 310.

Referring to FIG. 2 again, the outward facing image acquisition unit 220 may acquire multiple outward facing images from the multiple cameras, a DB, or an external server. Hereafter, an outward facing image will be explained with reference to FIG. 4.

Figure 4:
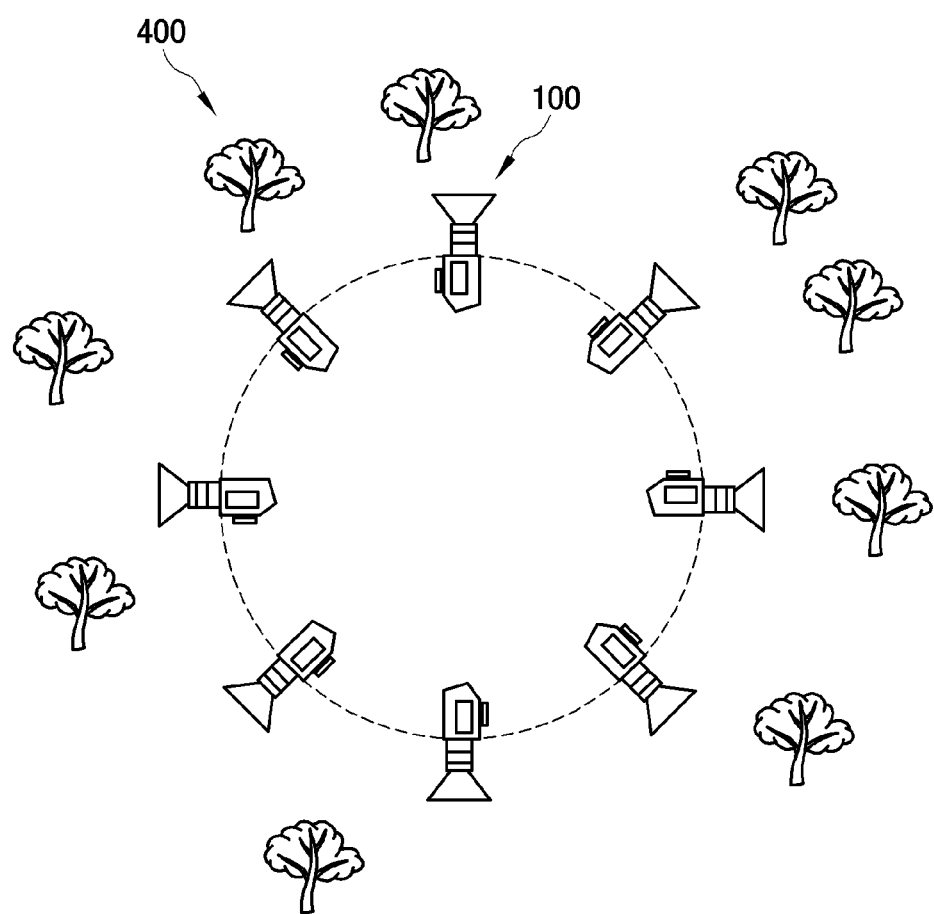
FIG. 4 is a diagram provided to explain an outward method according to an embodiment of the present disclosure.

FIG. 4 is a diagram provided to explain an outward method according to an embodiment of the present disclosure. Referring to FIG. 4, the multiple cameras 100 may be placed around a point and may take images of a background 410 toward the outside. The multiple cameras 100 may be arranged on a circle at a predetermined distance from the point.

The number of the multiple cameras used for taking outward facing images may be identical to or different from the number of the multiple cameras used for taking inward facing images, and the arrangement of the multiple cameras may not be changed except for a change in the directions of the lenses of the multiple cameras from inwards to outwards.

Referring to FIG. 2 again, the distortion correction unit 230 may correct distortion of the multiple inward facing images. Hereafter, a detailed configuration of the distortion correction unit 230 will be described with reference to FIG. 5.

Figure 5:
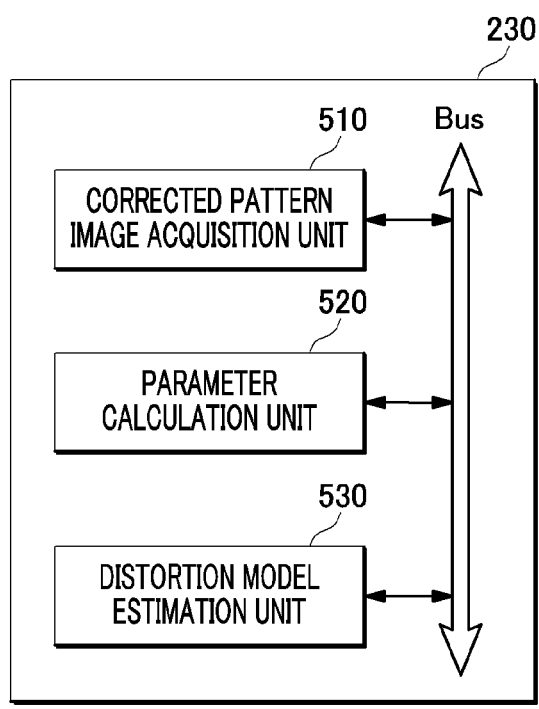
FIG. 5 is a diagram showing the configuration of a distortion correction unit according to an embodiment of the present disclosure.

FIG. 5 is a diagram showing the configuration of a distortion correction unit according to an embodiment of the present disclosure. Referring to FIG. 5, the distortion correction unit 230 may include a corrected pattern image acquisition unit 510, a parameter calculation unit 520, and a distortion model estimation unit 530.

The corrected pattern image acquisition unit 510 may acquire corrected pattern images from the multiple cameras arranged at a predetermined distance from the object and detect a lattice point.

The parameter calculation unit 520 may calculate internal parameters based on focal lengths of the lenses of the multiple cameras and the location of the object. The parameter calculation unit 520 may calculate external parameters based on location information of the multiple cameras.

The distortion model estimation unit 530 may estimate a distortion model of the multiple cameras based on the internal parameters and the external parameters and correct distortion of the images using the estimated distortion model. For example, a corner point may be inversely extracted from the estimated distortion model and verified and then, the distortion of the images may be corrected using the verified distortion model.

Referring to FIG. 2 again, the 3D object reconstruction unit 240 may extract a region of the object from the multiple inward facing images and generate a 3D object. Hereafter, a detailed configuration of the 3D object reconstruction unit 240 will be described with reference to FIG. 6.

Figure 6:
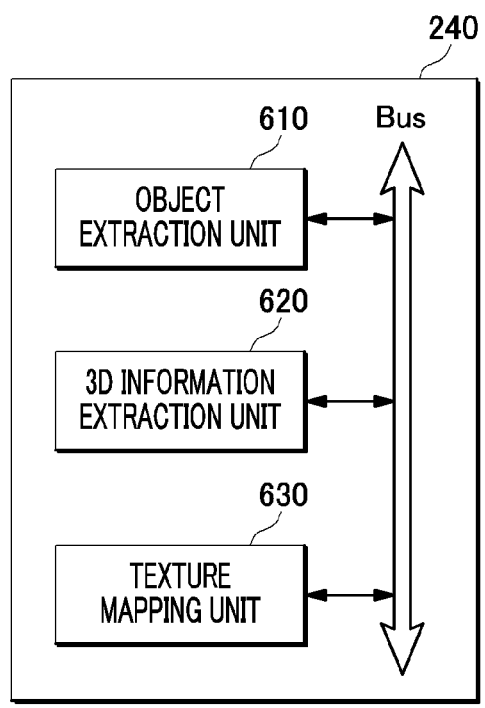
FIG. 6 is a diagram showing the configuration of a 3D object reconstruction unit according to an embodiment of the present disclosure.

FIG. 6 is a diagram showing the configuration of a 3D object reconstruction unit according to an embodiment of the present disclosure. Referring to FIG. 6, the 3D object reconstruction unit 240 may include an object extraction unit 610, a 3D information extraction unit 620, and a texture mapping unit 630.

The object extraction unit 610 may separate the moving object and the background from multiple distortion-corrected inward facing images and extract only the region of the object.

The object extraction unit 610 may trace and extract the object from the multiple inward facing images. If there are images between which the object is overlapped, the object extraction unit 610 may remove the overlapped part to collect object information. For example, the background is fixed and the object is moving, and, thus, the object extraction unit 610 may determine a difference value between a t frame and a t−1 frame as a movement area and extract the region of the object.

The object extraction unit 610 may trace the moving object and separate the object from the background. Then, the object extraction unit 610 may acquire object information from each viewpoint and make the images of the object from the respective viewpoints uniform in size to perform 3D modeling. For example, the object extraction unit 610 may acquire size information of x number of object images from n number of viewpoints, determine the size of an object image required for each viewpoint, and convert the sizes of the respective object images from other viewpoints to the required size. Distorted images need to be corrected to make the images of the object uniform in size. In this case, projective conversion may be used.

The object extraction unit 610 may perform camera calibration and calculate parameters of the multiple cameras to extract the region of the object.

The object extraction unit 610 may be composed of a primary Mixture of Gaussian (MoG) extraction unit, a secondary contrast map motion information unit, and a tertiary hierarchical region structure unit to accurately extract the object.

The MoG extraction unit may be configured to acquire a background pixel model, separate the object through background modeling, remove noise using a median filter and a morphology operation, and extract the region of the object using a critical value.

The contrast map motion information unit may be configured to find out a key feature point using a contrast map and a wavelet transform, generate an approximate attention window (AW) and estimate motion information based on the key feature point, and extract a difference in contour to extract the object.

The hierarchical region structure unit may be configured to segment an image using a watershed algorithm, merge regions with similar properties among the segmented regions, and generate a hierarchical structure to extract the object.

The 3D information extraction unit 620 may extract 3D information of the object using the internal parameters and the external parameters and generate a 3D mesh based on the 3D information.

The 3D information extraction unit 620 may generate a visual hull to restore geometric information of the object and generate a 3D mesh using the visual hull. Herein, the object can be separated from the background, a 2D silhouette image can be generated using a threshold value, and the visual hull can be obtained as the intersections of silhouette cones from respective viewpoints by shape-from-silhouette 3D reconstruction.

The 3D information extraction unit 620 may project 3D rays onto the images of the respective viewpoints to extract the visual hull and obtain constructive solid geometry (CSG) at the intersection of the projected rays.

When all of visual hull information is extracted, the 3D information extraction unit 620 may find out a skin covering a 3D object with minimal space using connectivity information between points present on the 3D object based on the restored geometric information and generate a 3D mesh.

The texture mapping unit 630 may assign color values to the 3D mesh. The texture mapping unit 630 may assign color values to respective vertices of a surface polygon of the 3D mesh or the entire polygon. Thus, the texture mapping unit 630 can provide a user with a sense of reality.

Referring to FIG. 2 again, the background image generation unit 250 may generate a 360° cylindrical image by stitching the multiple outward facing images and convert the 360° cylindrical image into a 360° spherical image to generate a background image. Hereafter, a detailed configuration of the background image generation unit 250 will be described with reference to FIG. 7.

Figure 7:
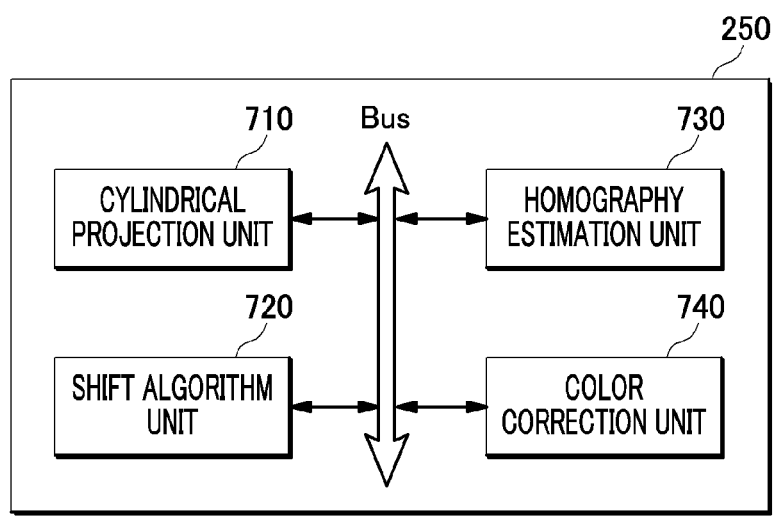
FIG. 7 is a diagram showing the configuration of a background image generation unit according to an embodiment of the present disclosure.

FIG. 7 is a diagram showing the configuration of a background image generation unit according to an embodiment of the present disclosure. Referring to FIG. 7, the background image generation unit 250 may include a cylindrical projection unit 710, a shift algorithm unit 720, a homography estimation unit 730, and a color correction unit 740.

The cylindrical projection unit 710 may project the multiple outward facing images onto a cylinder using a cylindrical coordinate converter. The cylindrical projection unit 710 may extract feature points of the backgrounds and rearrange and stitch the images. This is to extract coordinates for generation of the accurate spherical image.

The shift algorithm unit 720 may extract at least one feature of size, location, and illumination of the multiple outward facing images. The shift algorithm unit 720 may extract invariable features of size, rotation, illumination from the multi-view images and then find out an exact correspondence between the images based on the extracted features.

The homography estimation unit 730 may estimate a homography with an error equal to or lower than a preset value based on the features extracted by the shift algorithm unit 720 and then stitch the multiple outward facing images.

The homography estimation unit 730 may estimate a homography with a minimum error using a direct linear transformation between coincident feature points and then stitch the images.

The color correction unit 740 may correct colors of the stitched image. The color correction unit 740 may minimize a difference in color tone in the stitched image and thus generate a realistic image that makes the user feel as if it is taken by a single camera.

Although not illustrated in the drawing, the background image generation unit 250 may further include a spherical display unit that generates a 360° spherical image and displays the 360° spherical image on a display device so that the user can view the generated panoramic image from free viewpoints as he/she wants.

The spherical display unit performs graphical rendering to enable the panoramic image to be displayed as a 360° spherical image. The spherical display unit may use a function for converting the acquired 2D image into a 3D image coordinate system and display the 3D image in real time.

Referring to FIG. 2 again, the user interface unit 260 may receive a view change signal and an instruction signal about the object from the input device.

The user interface unit 260 may receive instruction signals to select, act, and move the object or view change signals to move up, down, left and right and zoom in and out from the input device.

If the user interface unit 260 is connected to a display device of the input device and composed of a motion sensor, a lip motion sensor, and a pupil sensor, the user interface unit 260 may provide a natural user interface (NUI) service that enables the user to control the object and the viewpoint with gestures.

The input signal control unit 270 may control the 360° background image and the 3D object based on the view change signal and instruction signal received through the user interface unit 260.

The input signal control unit 270 processes the 360° background image to be moved up, down, left, and right and zoomed in and out in response to the view change signal and thus enables the user to freely view the spherical image in real time.

The input signal control unit 270 may map the instruction signal into the object to select, move, and rotate the object.

The combined image transmission unit 280 may combine the 360° background image generated by the background image generation unit 250 with the 3D object generated by the 3D object reconstruction unit 240 and transmit the combined image to the display device.

The combined image transmission unit 280 may detect a feature point of the image and combine the object with the image so that the 3D object can be matched and stitched with the background image.

The combined image transmission unit 280 may combine the object and the image in a hybrid manner based on the received instruction signal and view change signal and generate a customized free viewpoint image and then transmit the free viewpoint image to the display device.

Figure 8:
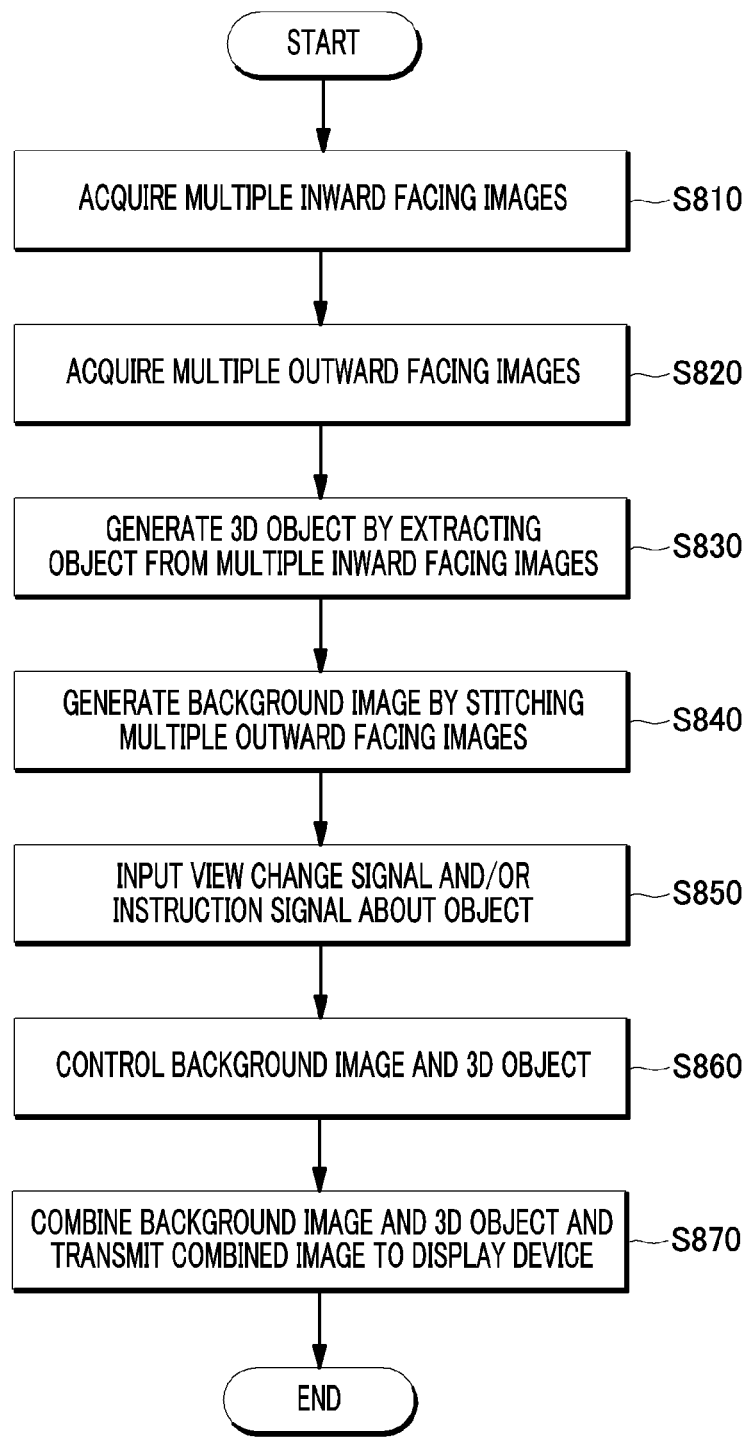
FIG. 8 is a flowchart showing a method for providing a realistic media content according to an embodiment of the present disclosure.

FIG. 8 is a flowchart showing a method for providing a realistic media content according to an embodiment of the present disclosure.

The method for providing a realistic media content according to the embodiment of the present disclosure illustrated in FIG. 8 includes the processes time-sequentially performed by the realistic media content providing system 1 according to the embodiment illustrated in FIG. 1. Therefore, descriptions of the realistic media content providing system 1 according to the embodiment illustrated in FIG. 1 may be applied to the method for providing a realistic media content according to the embodiment of the present disclosure illustrated in FIG. 8, even though they are omitted hereinafter.

Referring to FIG. 8, in process S810, multiple inward facing images are acquired, and in process S820, multiple outward facing images are acquired. In process S830, a region of an object is extracted from the multiple inward facing images to generate a 3D object, and in process S840, the multiple outward facing images are stitched to generate a background image.

In process S850, a view change signal and/or an instruction signal about the object are input, and in process S860, the background image and the 3D object are controlled. In process S870, the background image and the 3D object are combined and then transmitted to the display device.

In the descriptions above, the processes S810 to S870 may be divided into additional processes or combined into fewer processes depending on an embodiment. In addition, some of the processes may be omitted and the sequence of the processes may be changed if necessary.

The method for providing a realistic media content according to the embodiment of the present disclosure described above with reference to FIG. 8 can be implemented in a computer program stored in a medium to be executed by a computer or a storage medium including instructions codes executable by a computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The realistic media content providing device according to an embodiment of the present disclosure can be applied to technology of creating various contents and displaying images considering one-to-many bidirectional communication, N scree-based smart devices, viewing conditions, and the like, and can also contribute to improvement in quality of customized interactive broadcasting technology interacting with developing viewers.

It is possible to secure a technology verified through a field test in an environment with Internet access. Also, it is possible to provide a service capable of linking free viewpoint images and sound with applicability to a next-generation stereoscopic broadcasting service and thus enhance technical competitiveness.

Further, it is possible to construct a service network for next-generation personal broadcasting by linking education, advertising, and various entertainment services through a realistic personal broadcasting service.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A device for providing a realistic media content, comprising:

an inward facing image acquisition unit configured to acquire multiple inward facing images that are taken by an inward method using multiple cameras arranged around an object;

an outward facing image acquisition unit configured to acquire multiple outward facing images that are taken by an outward method using the multiple cameras arranged around a point;

a background image generation unit configured to generate a 360° cylindrical image by stitching the multiple outward facing images and then convert the 360° cylindrical image into a 360° spherical image to generate a background image;

a 3D object reconstruction unit configured to extract a region of the object from the multiple inward facing images to generate a 3D object;

a user interface unit configured to receive a view change signal and an instruction signal about the object from an input device;

an input signal control unit configured to control the background image and the 3D object based on the received view change signal and instruction signal; and a combined image transmission unit configured to combine the background image with the 3D object and transmit the combined image to a display device, wherein the multiple inward facing images and the multiple outward facing images are taken by the multiple cameras installed at the same frames by rotating the multiple cameras inwards and outwards.

2. The device for providing a realistic media content of claim 1, further comprising:
a distortion correction unit configured to correct distortion of the multiple inward facing images,
wherein the distortion correction unit includes:
a corrected pattern image acquisition unit configured to acquire corrected pattern images from the multiple cameras arranged at a predetermined distance from the object;
a parameter calculation unit configured to calculate internal parameters based on focal lengths of the lenses of the multiple cameras and a location of the object and calculate external parameters based on location information of the multiple cameras; and
a distortion model estimation unit configured to estimate a distortion model of the multiple cameras based on the internal parameters and the external parameters.

3. The device for providing a realistic media content of claim 2,
wherein the 3D object reconstruction unit includes:
an object extraction unit configured to separate the region of the object and the background image from the multiple distortion-corrected inward facing images and extract only the region of the object;
a 3D information extraction unit configured to extract 3D information of the object using the internal parameters and the external parameters and generate a 3D mesh based on the 3D information; and
a texture mapping unit configured to assign color values to the 3D mesh.

4. The device for providing a realistic media content of claim 1,
wherein the background image generation unit includes:
a cylindrical projection unit configured to project the multiple outward facing images onto a cylinder by using a cylindrical coordinate converter;
a shift algorithm unit configured to extract at least one feature of size, location, and illumination of the multiple outward facing images;
a homography estimation unit configured to estimate a homography with an error equal to or lower than a preset value based on the features and then stitch the multiple outward facing images; and
a color correction unit configured to correct colors of the stitched image.

5. The device for providing a realistic media content of claim 1,
wherein the multiple inward facing images are taken with the multiple cameras arranged on a circle with a first radius in a chroma-key background,
the multiple outward facing images are taken with the multiple cameras arranged on a circle with a second radius, and
the first radius is identical to the second radius.

* * * * *